(12) United States Patent
Lewis

(10) Patent No.: US 9,941,772 B2
(45) Date of Patent: Apr. 10, 2018

(54) MARINE PROPULSION SYSTEMS

(75) Inventor: Eric Anthony Lewis, Warwickshire (GB)

(73) Assignee: GE Energy Power Conversion Technology LTD. (GB)

( * ) Notice: Subject to any disclaimer, the term of this patent is extended or adjusted under 35 U.S.C. 154(b) by 94 days.

(21) Appl. No.: 13/878,865

(22) PCT Filed: Oct. 14, 2010

(86) PCT No.: PCT/GB2010/001910
§ 371 (c)(1),
(2), (4) Date: Jun. 12, 2013

(87) PCT Pub. No.: WO2012/049441
PCT Pub. Date: Apr. 19, 2012

(65) Prior Publication Data
US 2014/0145448 A1    May 29, 2014

(51) Int. Cl.
| | | |
|---|---|---|
| *F03B 13/00* | (2006.01) | |
| *F03B 13/10* | (2006.01) | |
| *H02K 7/08* | (2006.01) | |
| *B63H 21/17* | (2006.01) | |
| *B63H 23/24* | (2006.01) | |
| *H02J 3/00* | (2006.01) | |
| *H02J 3/34* | (2006.01) | |
| *H02K 7/18* | (2006.01) | |

(52) U.S. Cl.
CPC ............. *H02K 7/083* (2013.01); *B63H 21/17* (2013.01); *B63H 23/24* (2013.01); *H02J 3/005* (2013.01); *H02J 3/34* (2013.01); *H02K 7/183* (2013.01); *B63B 2241/22* (2013.01)

(58) Field of Classification Search
CPC ........ H02K 7/083; B63H 21/17; B63H 23/24; H02J 3/005; H02J 3/34
USPC .................... 290/31, 43, 54; 440/1
See application file for complete search history.

(56) References Cited

U.S. PATENT DOCUMENTS

| | | | |
|---|---|---|---|
| 4,407,903 A | 10/1983 | Gutbier et al. | |
| 7,633,770 B2 * | 12/2009 | Datta ................. | H02M 7/49 363/35 |
| 2003/0058597 A1 * | 3/2003 | Bruckmann ......... | H02J 7/0029 361/100 |

(Continued)

FOREIGN PATENT DOCUMENTS

| | | |
|---|---|---|
| CN | 1845847 A | 10/2006 |
| CN | 101326098 | 4/2012 |

(Continued)

OTHER PUBLICATIONS

Lewis, E., (2010) "Developments in Electric Propulsion Systems to Improve Efficiency," IMarEST Ship Propulsion Systems Conference, Jan. 27-28, 2010, London.

(Continued)

*Primary Examiner* — Viet Nguyen
*Assistant Examiner* — Thomas Quigley
(74) *Attorney, Agent, or Firm* — Wood IP LLC

(57) ABSTRACT

The present invention provides a marine propulsion system that is suitable for any civilian and military marine vessels and which offers operational flexibility. The marine propulsion system includes a pair of ac busbars, each in parallel connection with a power converter. The respective power converters each connected in parallel to a propulsion motor.

10 Claims, 3 Drawing Sheets

(56) References Cited

U.S. PATENT DOCUMENTS

2008/0315583 A1* 12/2008 Beck et al. ............... 290/31
2009/0156068 A1*  6/2009 Barrett et al. ............ 440/3
2009/0215328 A1*  8/2009 Daffey .................... 440/1

FOREIGN PATENT DOCUMENTS

| DE | 10 2008 022 077 A1 | 11/2009 |
|----|--------------------|---------|
| GB | 191515008 A | 10/1916 |
| GB | 2 445 382 A | 7/2008 |
| WO | 2005/002037 A1 | 1/2005 |
| WO | 2009/135736 A1 | 11/2009 |

OTHER PUBLICATIONS

Stephens, R.I. & Childs, J.F. (2010) "Optimising DP Vessel Power Systems Using Advanced Converter Technology," European Dynamic Positioning Conference, May 26-27, 2010, London.

Stephens, R.I. & Childs, J.F. (2010), "Optimising Dynamically Positioned Vessel Power Systems Using Advanced Converter Control," UKACC International Conference on Control (Control 2010), Sep. 7-10, 2010, Coventry, UK.

"The Diesel-Electric Power/Propulsion System of the USCG Icebreaker 'Healy'," Marine Engineers Review, Institute of Marine Engineers, London, GB Apr. 1, 1995 (Apr. 1, 1995), p. 42/43.

First Office Action and Search issued in connection with corresponding CN Application No. 201080069622.X dated Apr. 29, 2015.

Office Action issued in connection with corresponding EP Application No. 10773372.7 dated Feb. 14, 2017.

\* cited by examiner

MARINE PROPULSION SYSTEMS

FIELD OF THE INVENTION

The present invention relates to marine propulsion systems, and in particular to marine propulsion systems that employ active front end (AFE) power converters and which can be installed in any suitable marine vessel, either civilian or military.

BACKGROUND OF THE INVENTION

Marine propulsion systems that employ active front end (AFE) power converters and dual ac busbars are well known. With reference to FIG. 1, in a typical arrangement a series of AFE power converters 2 are used to interface ac busbars 4a, 4b to electric propulsion motors T1-T4. Each AFE power converter 2 includes a first active rectifier/inverter 6 (or 'front end' bridge) having ac terminals connected to the ac busbar and a second active rectifier/inverter 8 having ac terminals connected to the propulsion motor. The dc terminals of the first and second active rectifier/inverters 6, 8 are connected together by a dc link 10. Harmonic filters 12 may be connected to the ac terminals of the first active rectifier/inverter 6. In normal operation, the first active rectifier/inverter 6 will operate as an active rectifier to supply power to the dc link 10 and the second active rectifier/inverter 8 will operate as an inverter, but reverse operation may be possible in certain circumstances such as regenerative braking.

Each active rectifier/inverter 6, 8 will typically have a conventional three-phase two-level topology with a series of semiconductor power switching devices (e.g. IGBTs) fully controlled and regulated using a pulse width modulation strategy. However, in practice the active rectifier/inverters can have any suitable topology such as a three-level neutral point clamped topology or a multi-level topology, for example.

A series of prime movers (e.g. diesel engines) are connected to individual generators G1-G4 which supply ac power to the marine propulsion system through the ac busbars 4a, 4b. The ac busbars 4a, 4b may be equipped with protective switchgear with circuit breakers and associated controls. The marine propulsion system will typically include a first (or port) ac busbar 4a and a second (or starboard) ac busbar 4b. The busbars may be interconnected by a tie 14.

The ac busbars 4a, 4b may carry a low voltage (LV) supply voltage such as 690 V.

Because the marine propulsion system uses an LV supply voltage, and the fact that AFE power converters produce minimal harmonics, there is no need for converter transformers that are commonly found in other systems. This reduces the physical size and weight of the marine propulsion system. However, the use of an LV supply voltage produces high fault currents which must be accounted for in the rating of the protective switchgear. Certain operational restrictions may need to be imposed, for example the number of generators may need to be constrained to limit the maximum fault current. Although the marine propulsion system shown in FIG. 1 has advantages in terms of its physical size and weight, it also lacks some operational flexibility.

SUMMARY OF THE INVENTION

An alternative arrangement may provide additional operational flexibility and provides a marine propulsion system comprising: a first ac busbar; a second ac busbar; a first power converter including: a first active rectifier/inverter having ac terminals connected to the first ac busbar and dc terminals, and a second active rectifier/inverter having dc terminals connected to the dc terminals of the first active rectifier/inverter by a dc link and ac terminals; a second power converter including: a third active rectifier/inverter having ac terminals connected to the second ac busbar and dc terminals, and a fourth active rectifier/inverter having dc terminals connected to the dc terminals of the third active rectifier/inverter by a dc link and ac terminals; and a first propulsion motor having ac terminals connected in parallel to the ac terminals of the second active rectifier/inverter and the fourth active rectifier/inverter.

Such a marine propulsion system may be conveniently referred to as a dual fed 'active front end' (AFE) arrangement where the first and second power converters are AFE power converters of the type generally described with reference to FIG. 1 and each propulsion motor has the capability to receive power from both the first and second busbars. The propulsion motor and its associated AFE power converters may be conveniently referred to as a propulsion drive system. The marine propulsion system may have any convenient number of ac busbars and is not limited to a dual fed arrangement. Each propulsion motor will typically be connected to each ac busbar by an AFE power converter but if there are three or more busbars then it will be readily appreciated that a number of different propulsion drive arrangements are possible.

The first and second ac busbars may have any suitable number of phases but three would be typical.

The active rectifier/inverters that form part of each AFE power converter may have any suitable topology such as a two- or three-level neutral point clamped topology or a multi-level topology with a series of semiconductor power switching devices such as IGBTs, IGCTs and IEGTs fully controlled and regulated using a pulse width modulation strategy, for example.

A first filter system may be connected to the ac terminals of the first active rectifier/inverter and a second filter system may be connected to the ac terminals of the third active rectifier/inverter. In general terms a filter system may be associated with each AFE power converter. The filter systems are designed to filter the harmonics generated by the normal operation of the first and third active rectifier/inverters (i.e. the 'front end' bridges) and keep total harmonic distortion (THD) within the first and second ac busbars to within desired limits. Converter transformers are not required.

A connection (busbar tie) may be provided between the first and second ac busbars. During normal operation the connection will be open but can be closed provided that both the resulting fault level of the combined first and second ac busbars is within the rating of the protective switchgear or other protective circuits and the change in the operating modes are acceptable for the operating conditions of the marine vessel.

The first and second ac busbars may be divided into individual sections. All connections to the ac busbars and between the individual busbar sections may include protective switchgear or other protective circuits for isolation purposes.

At least one ac generator will normally be connected to each of the first and second ac busbars. The ac generators provide ac power to the ac busbars and have associated prime movers (e.g. turbines or diesel engines). Any suitable number of ac generators can be provided. Each ac generator may have an associated voltage controller or regulator such as an Automatic Voltage Regulator (AVR). Generators and propulsion drive systems can be connected to individual busbar sections to maximise the availability of propulsion power during fault conditions.

The propulsion motor may be of any suitable type (induction, synchronous etc.) and have any suitable phase (three-phase etc). The propulsion motor may be configured with its rotor coaxially inside or outside its stator and may employ any suitable field means (permanent magnet, conventional or superconducting windings etc).

A pair of propulsion motors may form part of a dual motor drive using two separate motors that are adapted to drive a common shaft such as propeller shaft. A pair of propulsion motors may also form part of a dual motor drive with the two motors physically built or located in a common housing (e.g. a tandem motor) and adapted to drive a common shaft. It will be readily appreciated that an individual marine vessel may use any particular number and configuration of propulsion motors (and associated AFE power converters) depending on its propulsion requirements.

The propulsion motor may be used to drive a propeller. The propeller may be of any convenient type such as conventional multi-bladed screws or ducted pump jets, for example. The propulsion motor may be located within the hull of a marine vessel (i.e. an in-board propulsion motor driving a propeller via a shaft line with a stern gland), in a pod that is suspended below the hull of the marine vessel to provide both propulsion and steering, or coaxially outside the hull of a submarine, for example. The propulsion motor may be a thruster that can be turned to apply thrust in any given direction.

The marine propulsion system may have any suitable number of propulsion motors, each being connected to the first and second ac busbars by associated AFE power converters. Put another way the marine propulsion system may have any suitable number of propulsion drive systems. For example, the marine propulsion system may further comprise a second propulsion drive system or more specifically: a third power converter including: a fifth active rectifier/inverter having ac terminals connected to the first ac busbar and dc terminals, and a sixth active rectifier/inverter having dc terminals connected to the dc terminals of the fifth active rectifier/inverter by a dc link and ac terminals; a fourth power converter including: a seventh active rectifier/inverter having ac terminals connected to the second ac busbar and dc terminals, and an eighth active rectifier/inverter having dc terminals connected to the dc terminals of the seventh active rectifier/inverter by a dc link and ac terminals; and a second propulsion motor having ac terminals connected in parallel to the ac terminals of the sixth active rectifier/inverter and the eighth active rectifier/inverter.

The dual fed AFE arrangement allows each propulsion motor to receive power from both the first and second ac busbars during normal operating conditions. Power can be supplied in a selected ratio from the first and second ac busbars. In other words the AFE power converters can be rated to each supply 50% of the power to the propulsion motor or in any chosen ratio up to each AFE power converter supplying 100% of the power. The ratio may be selected based on the required power during fault conditions and can be altered in "real-time" in accordance with the marine vessel operation. Similar ratios and AFE power converter ratings may be selected if the marine propulsion system has three or more busbars.

If there is a fault in one of the AFE power converters then the effects of the fault must be limited to the ac busbar to which the AFE power converter is connected. The other ac busbar is then not affected. This is an important feature of the marine propulsion system so that any fault in one of the AFE power converters will not produce a fault on both of the first and second ac busbars. This means that the propulsion motor can continue to operate during fault conditions as described in more detail below. The rectifier/inverters (or bridges) used in the AFE power converters are preferably designed such that they are not damaged by a short circuit at the ac output terminals that are connected to the propulsion motor, i.e. they have short circuit proofing. Similar short circuit proofing may be provided at the ac input terminals that are connected to the associated ac busbar. Such a rectifier/inverter will shutdown safely in the event of a short circuit fault and will not be damaged. This is achieved by having very fast-acting overcurrent detecting sensors fitted near the ac output terminals that are connected to the propulsion motor (or the ac input terminals) and which act to stop the operation of the switching devices of the AFE power converter in a very short time, 10 μs being typical. This protects the switching devices and prevents them from being damaged.

If a fault occurs in one of the AFE power converters of a particular propulsion drive system then the associated protective switchgear or protective circuits will operate to isolate it from the ac busbar to which its ac input terminals are connected. If the AFE power converter is still applying a short circuit at its ac output terminals then the other AFE power converter will not be damaged because its short circuit proofing will cause it to automatically shutdown safely. This ensures that the other AFE power converter does not apply a fault to the other ac busbar to which its ac input terminals are connected. Any other propulsion drive systems may therefore continue to operate normally and receive power from both ac busbars.

As an additional safety feature then protective switchgear or protective circuits, e.g. in the form of fast-acting isolation contactors, may be provided at the ac output terminals of each AFE power converter to isolate the AFE power converters from the propulsion motor. In such an arrangement then if a fault occurs in one of the AFE power converters of a particular propulsion drive system its protective switchgear or protective circuits can be operated to fully isolate it. Any other propulsion drive systems may therefore continue to operate normally and receive power from both ac busbars. Moreover, the other AFE power converter is now isolated from the faulty AFE power converter by the protective switchgear or protective circuits and the propulsion motor can continue to receive power from the other ac busbar.

If a fault occurs in one of the ac busbars then the protective switchgear or protective circuits can be operated so that all the propulsion motors can continue to receive power from the other ac busbar.

The dual fed AFE arrangement provides several technical advantages over the arrangement shown in FIG. 1.

Each propulsion motor can operate at a predetermined power level when no power is received from one of the ac busbars. Also, the power for any given propulsion motor can be taken from the ac busbars in the ratio that makes best use of the available power. Since the worst case failure has less effect on the capability of the marine vessel then there is potential to reduce installed thrust or installed power generation requirements with no loss of operational performance.

If a particular AFE power converter develops a fault then it can be isolated to allow the propulsion motor to continue to operate with power from the other ac busbar. This can reduce fuel consumption for many operating conditions with no loss of operational performance. For example, if a marine propulsion system has four identically rated propulsion drive systems each operating at 50% thrust then due to the characteristics of propellers where propeller thrust varies as propeller speed squared and propeller power varies as propeller speed cubed:

Total thrust=200%
Each propulsion motor is at 50% of rated thrust
Each propulsion motor is at 70.7% of rated speed
Each propulsion motor is at 35.4% of rated power
Total power=141.6%

In a conventional marine propulsion system like that shown in FIG. 1 where each propulsion drive system is connected to just a single ac busbar then a fault in one of the ac busbars would mean that only two propulsion drive systems would be operational. To provide the same total thrust (=200%) then since only two propulsion motors are operational:

Each propulsion motor is at 100% of rated thrust
Each propulsion motor is at 100% of rated speed
Each propulsion motor is at 100% of rated power
Total power=200%

The most severe fault condition is a short circuit within one of the ac busbars. If one of the ac busbars develops a fault then the protective switchgear or protective circuits associated with the relevant AFE power converters will operate to automatically isolate them from the faulty ac busbar so that all four propulsion motors can continue to operate at a reduced power level. To provide the same total thrust (=200%) then since all four propulsion motors are operational:

Each propulsion motor is at 50% of rated thrust
Each propulsion motor is at 70.7% of rated speed
Each propulsion motor is at 35.4% of rated power
Total power=141.6%

This is a significant saving of power compared to the conventional system where a total power of 200% is required to achieve the same total thrust.

If there is a fault within one of the AFE power converters then the protective switchgear or protective circuits associated with the faulty AFE power converter will operate and as a minimum three propulsion motors will be operational once the faulty AFE power converter has been automatically isolated from both the ac busbar and the propulsion motor. To provide the same total thrust (=200%) then since only three propulsion motors are operational:

Each propulsion motor is at 66.7% of rated thrust
Each propulsion motor is at 81.7% of rated speed
Each propulsion motor is at 54.5% of rated power
Total power=163.4%

This is still a significant power saving.

It will be readily appreciated that these are simply examples and that in any given marine propulsion system greater or fewer than four propulsion motors might be included. The propulsion motors can have the same or different power rating. When the power ratings are different then the available power can be calculated in the same way as shown above but will be based on the specific installed power ratings.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
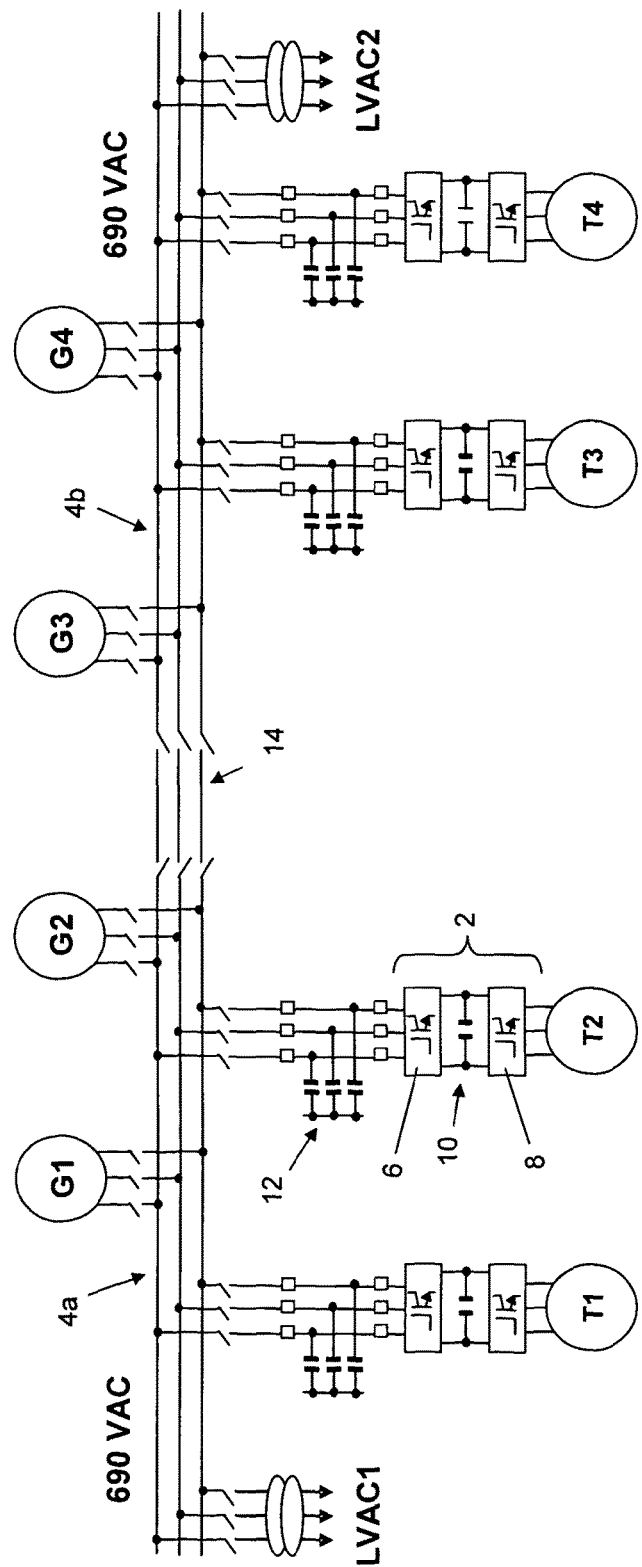
FIG. 1 is a schematic drawing showing a conventional marine propulsion system with active front end (AFE) power converters.
Figure 2:
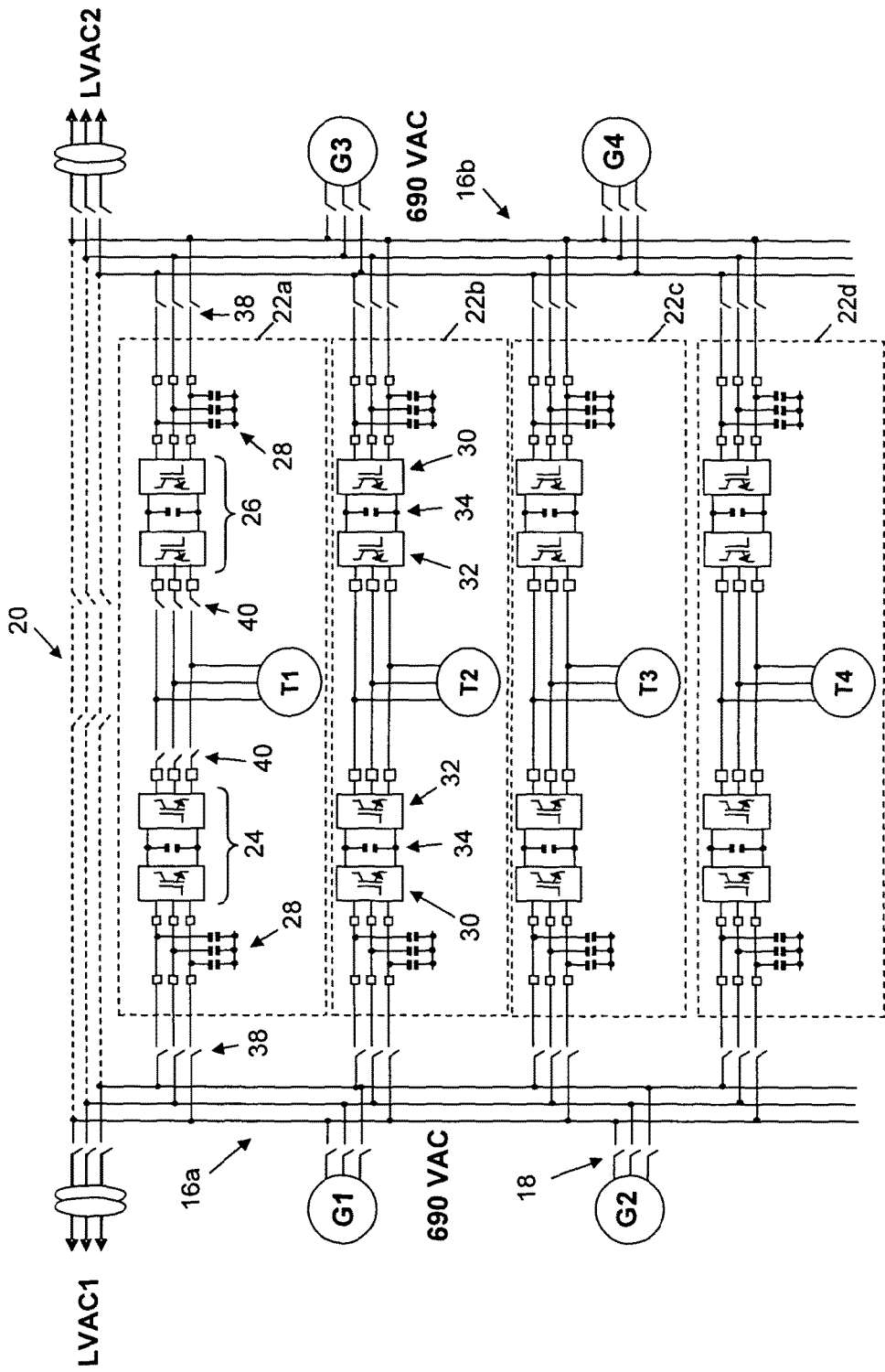
FIG. 2 is a schematic drawing showing a dual fed marine propulsion system according to a first embodiment of the present invention.

With reference to FIG. 2 a dual fed a marine propulsion system according to the present invention includes a first ac busbar 16a and a second ac busbar 16b. The first and second ac busbars 16a, 16b may carry a low voltage (LV) supply voltage (e.g. 690 V) and may optionally be divided into separate individual sections.

A pair of ac generators G1, G2 are connected to associated prime movers (not shown) and supply ac power to the first ac busbar 16a. A pair of ac generators G3, G4 are also connected to associated prime movers (not shown) and supply ac power to the second ac busbar 16b. The generators G1-G4 are connected to the respective ac busbar by protective switchgear 18 with circuit breakers and associated controls or other switching means. It will be readily appreciated that the marine propulsion system may have any suitable number of ac generators and any suitable busbar configuration depending on the power generation and distribution requirements.

The ac busbars 16a, 16b may be interconnected by a tie 20.

The marine propulsion system includes a series of four parallel propulsion drive systems 22a-22d. Each propulsion drive system includes an electric propulsion motor (or thruster) T1-T4 connected in parallel to the first and second ac busbars 16a, 16b by 'active front end' (AFE) power converters 24, 26 and associated harmonic filter systems 28. More particularly, a first AFE power converter 24 is connected between each propulsion motor and the first ac busbar 16a and a second AFE power converter 26 is connected between each propulsion motor and the second ac busbar 16b as shown in FIG. 2. Each AFE power converter includes a first active rectifier/inverter 30 (or 'front end' bridge) having ac input terminals connected to the respective ac busbar 16a, 16b and a second active rectifier/inverter 32 having ac output terminals connected to the propulsion motor. The propulsion motor is therefore connected to the ac output terminals of the second active rectifier/inverter 32 of each associated AFE power converter 24, 26 in parallel. The dc terminals of the first and second active rectifier/inverters 30, 32 for the first AFE power converter 24 are connected together by a dc link 34 and the dc terminals of the first and second active rectifier/inverters 30, 32 for the second AFE power converter 26 are connected together by a different dc link 34.

The ac input terminals of each first active rectifier/inverter 30 are connected to the associated ac busbar 16a, 16b by protective switchgear 38.

Although only shown for the first propulsion drive system 22a, the ac output terminals of each second active rectifier/inverter 32 are connected to the associated propulsion motor T1-T4 by fast-acting isolation contactors 40 that are an optional feature. The first and second AFE power converters 24, 26 are also short circuit proof with the ability to shutdown safely and automatically in the event of a short circuit at their ac terminals.

In normal operation, the first active rectifier/inverter 30 will operate as an active rectifier to supply power to the dc link 34 and the second active rectifier/inverter 32 will operate as an inverter to supply power to the propulsion motor, but reverse operation may be possible in certain circumstances such as regenerative braking where power is supplied from the propulsion motor (operating as a generator) back to the ac busbars 16a, 16b.

Each active rectifier/inverter 30, 32 may typically have a conventional three-phase two-level topology with a series of semiconductor power switching devices (e.g. IGBTs) fully controlled and regulated using a pulse width modulation strategy. However, in practice the active rectifier/inverters can have any suitable topology such as a three-level neutral point clamped topology or a multi-level topology, for example.

Additional ac busbars may be connected to ac busbars 16a, 16b by transformers so that the distribution voltages carried by the additional ac busbars are conveniently derived by transformer action. The additional ac busbars may be used to provide power to other electrical loads.

The propulsion motors T1-T4 may be of any suitable type and construction and are configured to drive a propeller shaft (not shown). It will be readily appreciated that in the dual fed AFE arrangement shown in FIG. 2 each propulsion motor T1-T4 can be supplied with power from both ac busbars 16a, 16b by means of the associated AFE power converters 24, 26. This provides increased flexibility and redundancy. For example, if a fault develops in the first AFE power converter 24 then this can affect the first ac busbar 16a but not the second ac busbar 16b. The first AFE power converter 24 for propulsion motor T1 can be isolated from both the first ac busbar 16a and the propulsion motor T1 by means of the protective switchgear 38, short circuit proofing shutdown capabilities and fast-acting isolation contactors 40. With the complete protective system described above, power can therefore continue to be supplied to the propulsion motor T1 from the second ac busbar 16b by means of the second AFE power converter 26. In other words, the effected propulsion motor T1 can continue to operate, but at a reduced thrust. If a fault occurs in propulsion motor T1 or the cabling that connects the propulsion motor to the associated AFE power converters 24, 26 then the relevant AFE power converters can be isolated from the ac busbars 16a, 16b. The remaining propulsion motors T2-T4 can continue to operate at a normal power level. For a fault in one of the ac busbars 16a, 16b then all four propulsion motors T1-T4 can continue to operate at a certain power level if the associated AFE power converters are isolated from the faulty ac busbar by the protective switchgear 38.

The AFE power converters 24, 26 can supply the power to the associated propulsion motor in any given ratio. For example, a propulsion motor may receive between 0 to 50% of its power from the first ac busbar 16a by means of the first AFE power converter 24 and between 50% to 100% of its power from the second ac busbar 16b by means of the second AFE power converter 26 or vice versa. The ratio may alter during normal operation of the marine propulsion system or during fault conditions, for example, to utilise the power that is available from the ac busbars 16a, 16b. By increasing the rating of the rectifier/inverters a power greater than 50% can be delivered when operating from only of the first and second AFE power converters.

Figure 3:
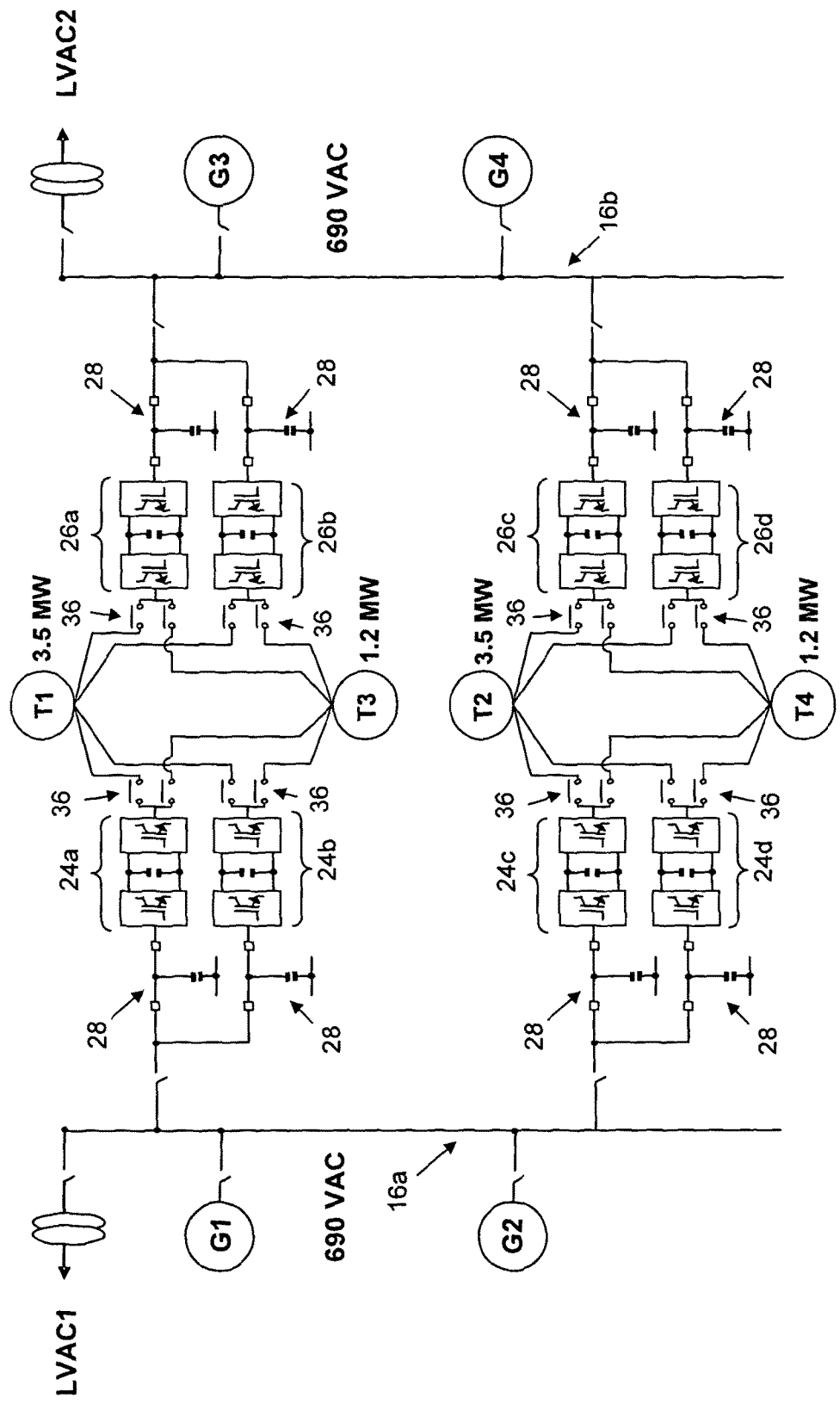
FIG. 3 is a schematic drawing showing a dual fed marine propulsion system according to a second embodiment of the present invention.

FIG. 3 shows an alternative marine propulsion system that could be used for dynamic positioning (DP) of a marine vessel. The basic overall arrangement is similar to the marine propulsion system of FIG. 2 and like parts have been given the same reference numerals. The marine propulsion system includes two large propulsion motors (or main thrusters) T1, T3 typically rated at 3.5 MW each and two smaller propulsion motors (or manoeuvring thrusters) T2, T4 for DP which are typically rated at 1.2 MW each. Each propulsion motor T1-T4 is connected to first and second busbars 16a, 16b by AFE power converters as described above. During transit of the marine vessel the manoeuvring thrusters T2, T4 are not required and the main thrusters T1, T3 receive power from the first ac busbar 16a by means of the AFE power converters 24a, 24b and 24c, 24d and from the second ac busbar 16b by means of the AFE power converters 26a, 26b and 26c, 26d. In other words, each of the main thrusters receives power from four AFE power converters, two being connected to the first ac busbar 16a and two being connected to the second ac busbar 16b. For DP operation the main thrusters T1, T3 will not require full power and can therefore receive power from any two of the four associated AFE power converters. For example, the first main thruster T1 can receive power from the first and second AFE power converters 24a, 26a leaving the third and fourth AFE power converters 24b, 26b to supply power to the first manoeuvring thruster T3 or vice versa. The propulsion motors T1-T4 are connected to the associated AFE power converters by suitable switching means 36 that can select whether power from the second active rectifier/inverter 32 of each AFE power converter 24, 26 is connected to the main thruster or the manoeuvring thruster of each propulsion drive system.

The marine propulsion system of FIG. 3 significantly reduces the cost of power electronics and reduces switchboard size, weight and cost Single point failure conditions are much reduced compared to conventional arrangements with increased fault tolerance since a fault in any of the AFE power converters will not affect both of the ac busbars 16a, 16b. The arrangement makes best use of installed power electronics and is particularly suitable for marine vessels where size and weight are important design considerations.

What is claimed is:

1. A marine propulsion system including a plurality of propulsion drive trains, comprising:
    first and second alternating current (AC) busbars;
    a plurality of first and second active front end (AFE) power converters having ac input terminals respectively connected to the first and second AC busbars;
    wherein ac output terminals of each of the first plurality of AFE power converters are respectively connected to AC output terminals of the second plurality of AFE power converters; and
    a plurality of propulsion motors, each having an AC terminal connected to the AC output terminals of a corresponding one of the plurality of first and second AFE power converters; and
    wherein each AFE power converter includes (i) a first active rectifier/inverter connected to the respective busbar via its AC input terminal and (ii) a second active rectifier/converter connected to the corresponding propulsion motor via its AC output terminal, DC terminals of the first and second active rectifier/inverters of each of the AFE power converters being coupled together;
    wherein the first and second active rectifier/inverters are configured for respective operation as a rectifier and an inverter simultaneously, the rectifier supplying power to the DC terminals, the inverter supplying power to at least one of the propulsion motors; and wherein a rating of the first and second active rectifier/inverters is adjustable to control an amount of the supplied power to the at least one propulsion motor in accordance with at least one of (i) a predetermined level and (ii) a ratio selected based upon required power during a fault condition.

2. A marine propulsion system according to claim 1 further comprising at least one generator connected to the first busbar and at least one generator connected to the second busbar.

3. A marine propulsion system according to claim 1 further comprising a first filter system connected between one of the first converters and the first busbar and a second filter system connected between one of the second converters and the second busbar.

4. A marine propulsion system according to claim 1 wherein the first converter is configured to, in the event of a short circuit, be isolated from the first propulsion motor.

5. A marine propulsion system according to claim 1, wherein the rectifier/inverters are adjustable in real-time.

6. A method for controlling a marine propulsion system including first and second alternating current (AC) busbars, each AC busbar configured to provide power in a dual fed arrangement to a plurality of propulsion motors via a corresponding plurality of propulsion drive trains, the drive trains including first and second active front end (AFE) power converters, each including active rectifier/inverters, the method comprising:

converting to direct current (DC) power, within one of the active rectifier/inverters of each of the first and second power converters, AC power received from the AC busbars for supply to a corresponding one of the propulsion motors, each motor being configured to receive power from each of the AC busbars;

configuring each of the AFE converters via a modulation strategy to supply the power to its corresponding propulsion motor at a predetermined level in accordance with a ratio;

detecting a fault condition within at least one of the AFE converters; and selecting the ratio based upon required power when the fault condition is detected.

7. A method for controlling a marine propulsion system according to claim 6, wherein the modulation strategy includes modulating a width of control pulses to control a switching of semiconductor devices within the AFE converters.

8. A method for controlling a marine propulsion system according to claim 6, wherein the detecting occurs via a detecting sensor within a corresponding one of the propulsion drive trains.

9. A method for controlling a marine propulsion system according to claim 6, wherein the ration is selected in real-time.

10. A method for controlling a marine propulsion system according to claim 6, further comprising isolating the faulty AFE converter, the isolating limiting fault to the corresponding AC busbar.

* * * * *